(12) United States Patent
Lefevre

(10) Patent No.: US 6,563,539 B1
(45) Date of Patent: May 13, 2003

(54) CHARGE TRANSFER CIRCUIT FOR USE IN IMAGING SYSTEMS

(75) Inventor: Andrew Paul Lefevre, Dunmow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/157,234

(22) Filed: Sep. 18, 1998

(51) Int. Cl.[7] ............................................... H04N 5/335
(52) U.S. Cl. ...................................... 348/295; 348/308
(58) Field of Search ............................ 348/216.1, 294, 348/295, 296, 297, 302, 308; 250/208.1

(56) References Cited

U.S. PATENT DOCUMENTS 4,779,005 A * 10/1988 Arnold ....................... 348/295
5,216,510 A * 6/1993 Amingual et al. ........ 348/216.1
5,729,285 A * 3/1998 Peterson et al. ............ 250/330
5,978,101 A * 11/1999 Hofmann et al. ......... 250/208.1

* cited by examiner

Primary Examiner—Tuan Ho
(74) Attorney, Agent, or Firm—Barnes & Thornburg

(57) ABSTRACT

A charge transfer circuit for an imaging array incorporates a number of concatenated charge transfer stages. Each stage has a charge storage element for storing accumulated charge generated by a photo-detector responsive to electromagnetic radiation incident thereon, and a transfer element to which the charge storage element is coupled. A first voltage driver is coupled to the storage element and a second voltage driver coupled to the transfer element. By selectively applying respective potential conditions to the storage elements and to the transfer elements of each stage of the array the accumulated charge stored in each storage element is transferred to the storage element of the next stage of the array to provide an integrated signal at the circuit output.

10 Claims, 6 Drawing Sheets

CHARGE TRANSFER CIRCUIT FOR USE IN IMAGING SYSTEMS

Charge transfer circuit for an imaging array, an imaging array incorporating the same and a method of operating an imaging array incorporating the same.

This invention relates optical and infra-red imaging systems, and in particular to charge transfer circuits for use in such systems.

BACKGROUND OF THE INVENTION

Imaging detectors, e.g. infra-red image detectors for use in night vision equipment, have been constructed using a number of technologies and circuit techniques. Such detectors typically comprise an array of optical or infra-red sensitive elements coupled to image processing circuitry, the assembly generally being fabricated on a common semiconductor, e.g. silicon, substrate. The detectors employ a process in which photo-emission from a particular image point is represented by a respective photo-detector current of corresponding magnitude. This current is integrated over a period of time in a cyclic integration process in which the accumulated charge from each element of the detector array is stored in a corresponding storage element during each integration cycle. At the end of the cycle, the storage element may be discharged or reset ready for the next cycle. The storage elements can for example be realised as potential wells in bulk silicon controlled by field plates, such as in charge coupled device (CCD) technology, or as discrete capacitors in the more commonly employed CMOS or BiCMOS technologies.

In an attempt to improve signal to noise ratios in such imaging systems, the technique of time delay integration (TDI) has been introduced by a number of workers. This technique requires the controlled integration and transfer of charge along a TDI chain of active devices and storage elements. This has the effect of averaging noise or transient components in the accumulated charge, while the total signal charge increases in proportion to the number of detectors. This has the advantage of increasing the signal to noise ratio by a theoretical factor of √n where n is the number of TDI stages in the chain.

A well established problem associated with imaging circuitry, particularly when employed for infra-red imaging is that of power dissipation. In order to reduce background noise to the minimum, the detector is cooled typically to the temperature of liquid nitrogen. It will be appreciated that the heating effect of the detector circuitry resulting from any excessive power dissipation will impair or negate the effects of cooling. Many workers have attempted to address this problem by the use of CMOS technology for the implementation of the TDI image read-out arrays. However, the unit gain stage amplifiers, which are needed in a conventional TDI array to transfer the accumulated charge from one stage to the next, suffer from two disadvantages when fabricated in CMOS technology. Firstly, each amplifier consumes power which, for a large array, results in a high total power dissipation. Secondly, CMOS amplifiers are inherently noisy at low frequencies and this partially negates the effectiveness if the TDI technique in overcoming the effects of background noise. For these reasons, further workers have investigated the use of bipolar semiconductor techniques.

The most commonly employed bipolar TDI arrays employ an analog shift register technique which is commonly referred to as a bucket brigade delay line. Such a technique is described for example by F L J Sangster et al. in IEEE Journal of Solid State Physics, Vol. SC-4, No. 3, June 1969, pp 131–136; and by G Krause in Electronics Letters, December, 1967, Vol. 3, No. 12, pp 544–546. Circuits of this type comprise a master and slave arrangement for each stage and use a two-phase clock for transferring charge between the master and slave circuits at each stage. While the use of bipolar circuitry significantly reduces the problem of electrical noise, the conventional bucket brigade arrangement suffers from two key limitations. Firstly, the dynamic range of the circuit is limited to about one half of the supply voltage which, for current bipolar processes is about 2.5 volts. This is because the clocking process causes both terminals of each charge storage element to rise in voltage by an amount equal to the sum of the maximum stored voltage and the bipolar transistor threshold voltage $V_{be}$. Secondly, the maximum voltage to which the circuit can be subjected is limited by the reverse breakdown voltage of the bipolar emitter/base junctions. In addition, the resetting of the charge storage capacitors requires both additional circuitry and additional cycle time for each TDI stage.

In a conventional charge transfer or time delay integration circuit, operational amplifier buffers are used in combination with switches to transfer charge via a voltage transfer technique. Such an arrangement provides an effective signal to noise ratio improvement, but suffers from the disadvantage of the relatively high power requirements of the buffers and of the significant number of components required for the buffer fabrication, the latter being costly in terms of semiconductor chip area.

Reference is here directed to my co-pending application Ser. No. 08/827243 which relates to a charge conveyor circuit for a time delay integration,(TDI) imaging system. In that circuit, storage capacitors are employed for charge integration from the front end circuit. This eliminates the need for a sample and hold circuit at every front end stage.

SUMMARY OF THE INVENTION

An object of the invention is to minimise or to overcome the above disadvantages.

A further object of the invention is to provide an improved imaging system and array.

A further object of the invention is to provide a charge integration circuit construction that is fully compatible with CMOS processing technology.

According to a first aspect of the invention, there is provided a charge transfer circuit for an imaging array, the circuit comprising a plurality of concatenated charge transfer stages each incorporating; a charge storage element for storing accumulated charge generated by a photo-detector responsive to electromagnetic radiation incident thereon, a transfer element to which the charge storage element is coupled, a first voltage driver coupled to the storage element, a second voltage driver coupled to the transfer element, and control means for said first and second voltage drivers, wherein the control means is arranged to apply selectively respective potential conditions to the storage element and to the transfer element of a said stage of the array so as to transfer the accumulated charge stored in the storage element to the storage element of the next stage of the array.

According to a another aspect of the invention, there is provided an imaging array comprising a plurality of time delay integration (TDI) charge transfer chains each said chain being constituted by a plurality of concatenated charge transfer stages each incorporating; a charge storage element for storing accumulated charge generated by a photodetector responsive to electromagnetic radiation incident thereon, and a voltage controllable transfer element to which the charge storage element is coupled, the transfer element having a first non-conductive condition and a second conductive condition, wherein the imaging array incorporates a first set of voltage drivers each coupled to a respective storage element one in each said TDI chain, a second set of voltage drivers each coupled to a respective transfer element one in each said TDI chain, and control means for said first and second voltage drivers, wherein the control means is arranged to apply selectively to each stage of each TDI chain in sequential order respective potential conditions to the storage element of a said stage and to the transfer element of the immediately preceding stage of the array so as to drive the transfer element of said stage into its conductive condition and to maintain the transfer element of the preceding sage in its non-conductive condition thereby to effect transfer of the accumulated charge stored in the storage element of said stage to the storage element of the succeeding stage of the TDI chain.

According to a further aspect of the invention there is provided a method of operating an imaging array comprising a plurality of time delay integration (TDI) charge transfer chains each said chain being constituted by a plurality of concatenated charge transfer stages each incorporating; a charge storage element for storing accumulated charge generated by a photo-detector responsive to electromagnetic radiation incident thereon, and a voltage controllable transfer element having a first non-conductive condition and a second conductive condition and to which the charge storage element is coupled, there being a first set of voltage drivers each coupled to a respective storage element one in each said TDI chain, and a second set of voltage drivers each coupled to a respective transfer element one in each said TDI chain, the method comprising the steps of;

applying selectively, via said first voltage drivers to each stage of each TDI chain in sequential order, respective potential conditions to the storage element of a said stage and to the transfer element of the immediately preceding stage of the array so as to drive the transfer element of said stage into its conductive condition and to maintain the transfer element of the preceding sage in its non-conductive condition thereby to effect transfer of the accumulated charge stored in the storage element of said stage to the storage element of the succeeding stage of the TDI chain.

According to another aspect of the invention there is provided a method of operating an imaging array comprising a plurality of time delay integration (TDI) charge transfer chains each said chain being constituted by a plurality of concatenated charge transfer stages each incorporating; a charge storage element for storing accumulated charge generated by a respective photo-detector responsive to electromagnetic radiation incident thereon, and a voltage controllable transfer element to which the charge storage element is coupled, the transfer element having a first non-conductive condition and a second conductive condition, the method comprising the steps of;

applying selectively to each stage of each TDI chain in sequential order respective potential conditions to the storage element of a said stage and to the transfer element of the immediately preceding stage of the array so as to drive the transfer element of said stage into its conductive condition and to maintain the transfer element of the preceding sage in its non-conductive condition thereby to effect transfer of the accumulated charge stored in the storage element of said stage to the storage element of the succeeding stage of the TDI chain.

According to a further aspect of the invention there is provided a charge transfer circuit for an imaging array, the circuit comprising a plurality of concatenated charge transfer stages each incorporating; a capacitive charge storage element in which, in use, charge is accumulated, and a transfer element comprising a field effect transistor coupled between said charge storage element and the charge storage element of the next concatenated stage, said transfer element having a first non-conductive condition and a second conductive condition determined by a potential condition applied thereto so as to provide selective transfer of the accumulated charge stored in said storage element to the storage element of said next concatenated stage.

Additional features of the invention will be set forth in the following description, and in part will be apparent from that description, or may be learned by practice of the invention. The objects and other advantages of the invention will be realised and attained by the circuit arrangement and method of operation thereof particularly pointed out in the written description and the claims hereof as well as the accompanying drawings.

BRIEF DESCRIPTION OF THE DRAWINGS

Embodiments of the invention will now be described with reference to the accompanying drawings in which.

DESCRIPTION OF PREFERRED EMBODIMENT

Figure 1:
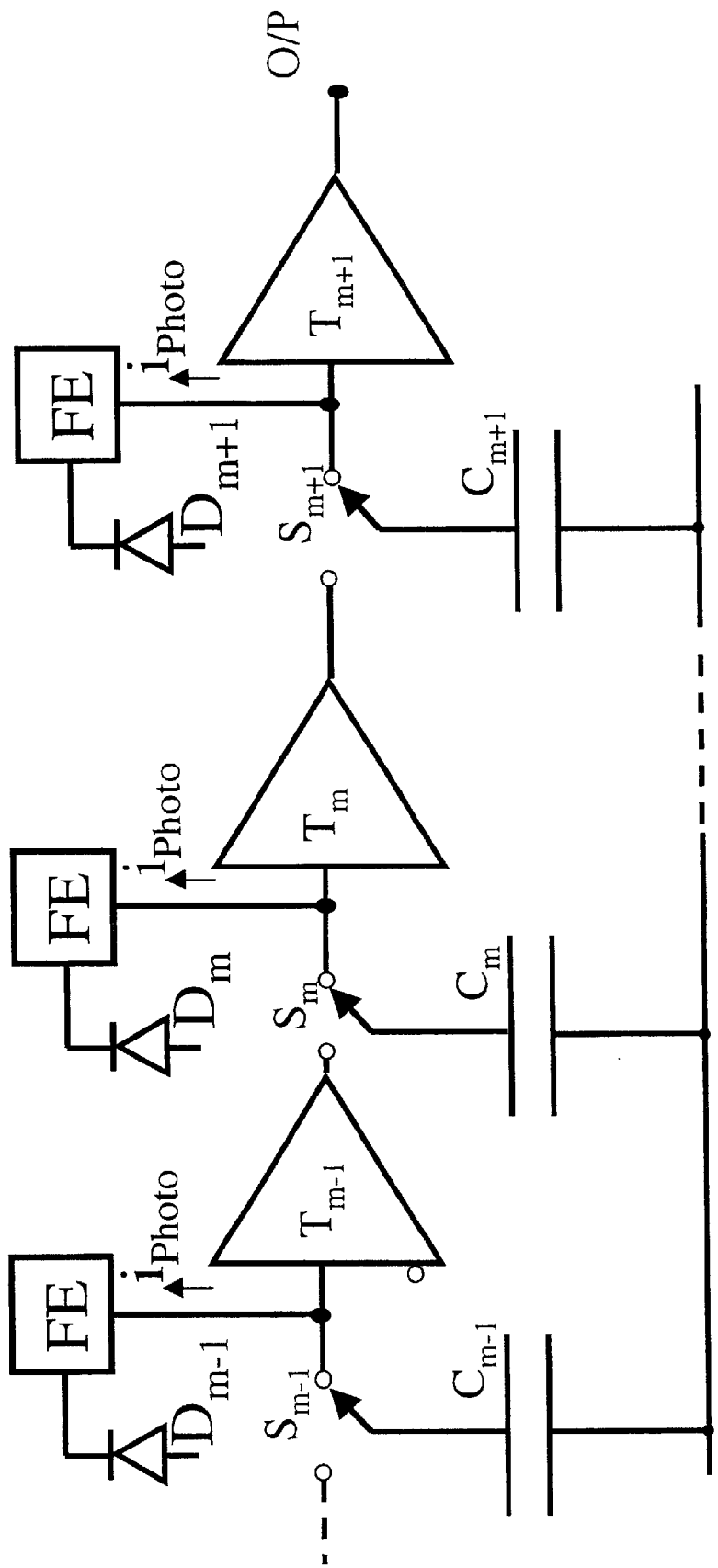
FIG. 1 shows a conventional charge transfer circuit arrangement.

Referring first to FIG. 1, which is introduced for comparative and explanatory purposes, this illustrates a conventional charge transfer or time delay integration (TDI) chain for use in an imaging system. The circuit integrates the output charge from a photo-detector 11 over a preset time period, that charge being dependent on the intensity of light or infra-red radiation incident on the photo-detector. The TDI chain comprises a number of similar concatenated stages, each comprising a capacitor $C_{m-1}$, $C_m$, $C_{m+1}$, ... each storing accumulated charge generated by a respective photo-detector $D_{m-1}$, $D_m$, $D_{m+1}$, ... a switch $S_{m-1}$, $S_m$, $S_{m+1}$, and a transfer buffer $T_{m-1}$, $T_m$, $T_{m+1}$, ... providing coupling to the next stage. The final transfer buffer of the chain provides an integrated signal to the output O/P of the chain. The transfer buffers are used to move the stored photo-detector charge along the chain so that the charges from the individual photo-detectors which are illuminated by the same image element are integrated on to the final capacitor $C_n$ of the chain for readout at the output O/P. Photo-current ($I_{photo}$) from each respective photo-diode is fed via a front end circuit (FE) which transfers the photo-current to the capacitor via the switch and which maintains a suitable bias level on the photo-diode. The buffers are of unit gain so as to achieve as closely as possible the theoretical signal to noise ratio improvement √n of the TDI technique. In practice, an image read-out array will comprise a large number of these TDI chains to provide a linear one-dimensional pixel array.

Figure 2:
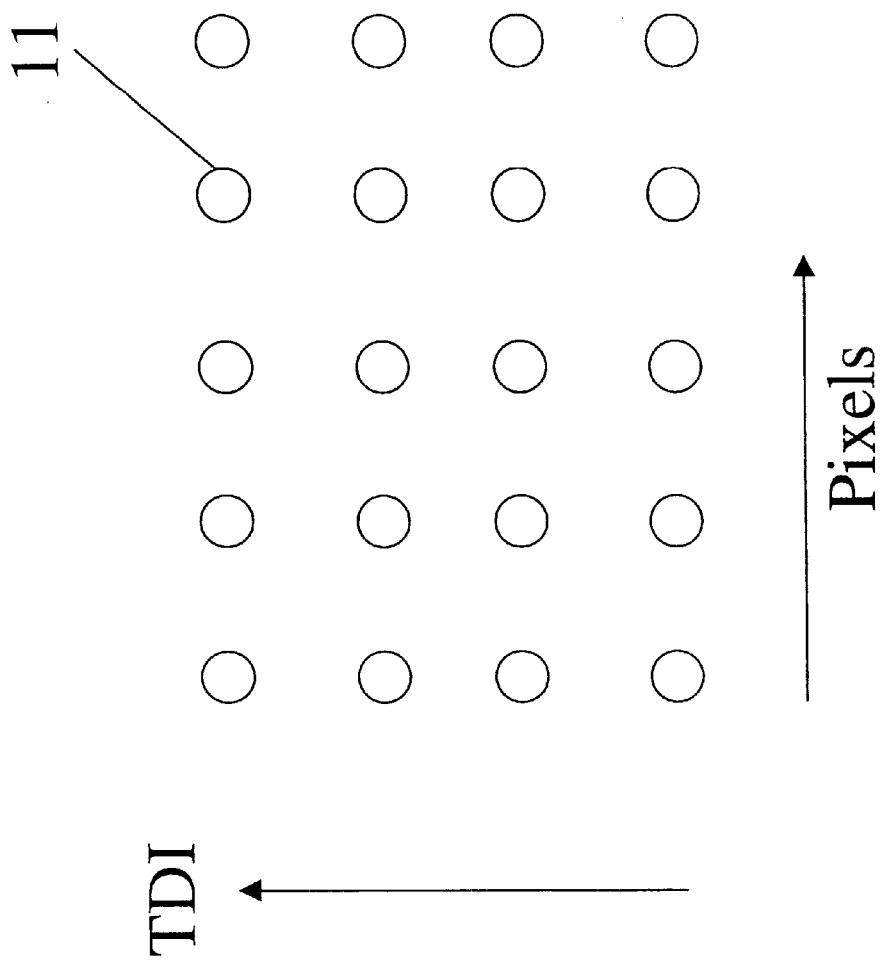
FIG. 2 shows in highly schematic form the configuration of an imaging array.

Referring now to FIG. 2, this shows in highly schematic form a typical photo-detector array construction. The array comprises a number of rows of photo-diodes 11 constituting the elements of the array. In use, the photo-diodes are all illuminated, with the TDI chain storing at any one time a number of accumulating or 'maturing' (m·q, m<n) charges representing different lines of pixels of the image with the last stage of the TDI chain containing an accumulated total n·q charge ready for output.

As discussed above, the conventional circuit arrangement of FIG. 1 suffers from the disadvantage of the relatively high power requirements of the transfer buffers. Further, as a transfer buffer is required for each stage of an imaging array comprising a number TDI chains, the problem of power dissipation is exacerbated.

Figure 3:
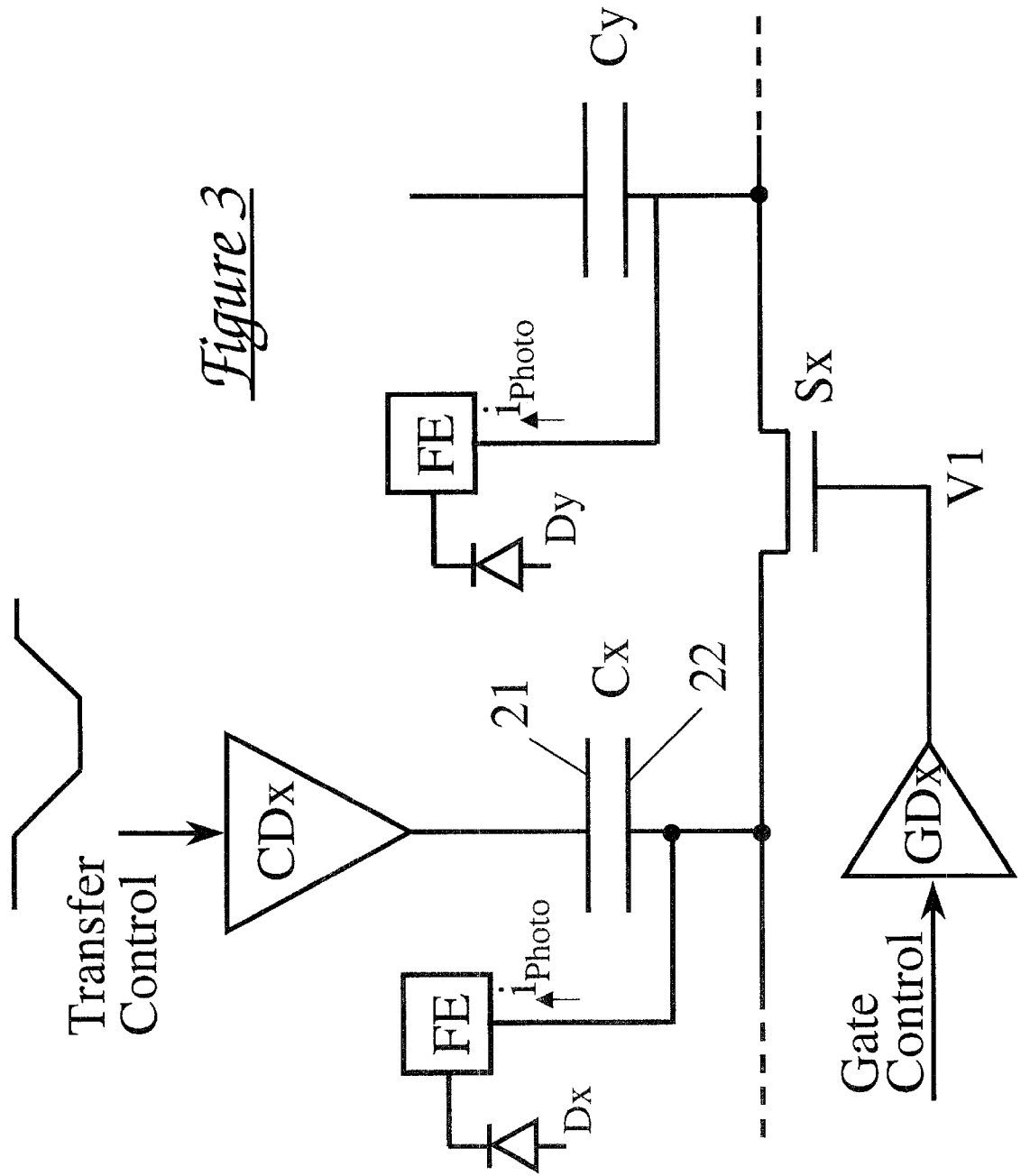
FIG. 3 shows a charge transfer circuit construction according to a preferred embodiment of the invention.
Figure 4:
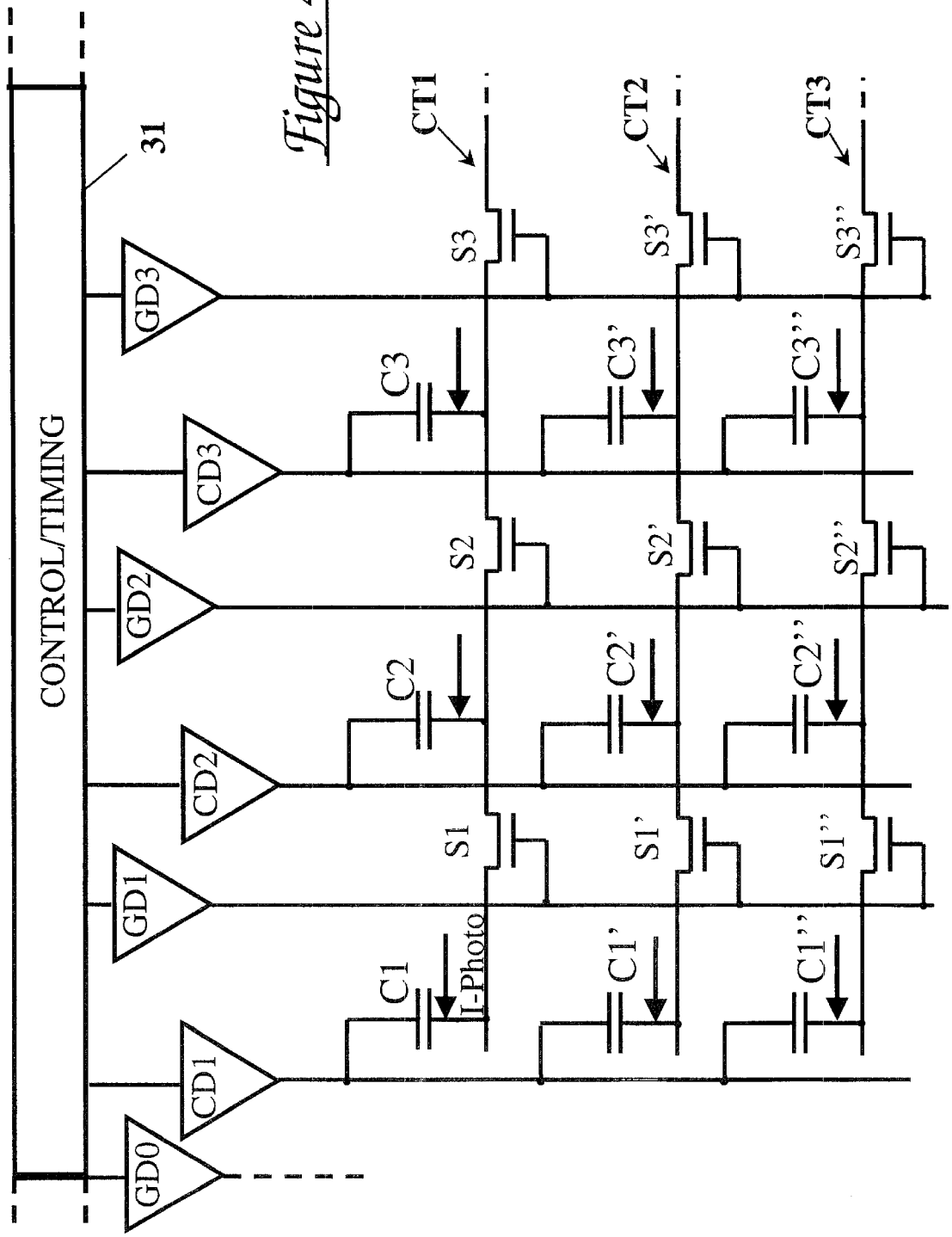
FIG. 4 shows part of a TDI chain incorporating the charge transfer circuit of FIG. 3.

Referring now to FIGS. 3 and 4, these illustrate respectively the construction of a charge transfer stage and of a TDI chain and integrating array according to a preferred embodiment of the invention. The charge transfer circuit stage shown in FIG. 3 incorporates a capacitor $C_X$ providing a storage means for accumulated charge generated by a photo-diode $D_X$ in response to incident electromagnetic radiation, and a field effect transfer element $S_X$, the latter being controlled by a voltage V1 applied to its gate terminal via a voltage driver $G_X$. It will be appreciated that the transfer element will have a first conductive condition and a second non-conductive condition determined by the relative potential of its gate terminal. A further voltage driver $CD_X$ is coupled to the capacitor $C_X$. Accumulated charge stored on the capacitor $C_X$ results in the establishment of a corresponding potential difference $V_c$ across that capacitor.

The operation of the circuit of FIG. 3 is as follows. The voltage driver $CD_X$ controls or clamps one plate (21) of the capacitor $C_X$ such that this plate is held at a fixed potential V2 during that part of the operating cycle in which charge is being accumulated. The field effect transistor comprising the transfer element $S_X$ is held in its off or non-conductive condition. During this period, charge from the photo-detector $D_X$ is stored in the capacitor $C_X$ thus setting up a corresponding potential difference $V_c$ across the plates of that capacitor. At the end of the charge accumulation period, the stored charge is transferred. To effect this transfer, the transfer element $S_{X-1}$ of the preceding stage is driven into its non-conductive condition by the application of a voltage to the transistor gate via the gate driver $GD_{X-1}$. At the same time, a control input is provided to the voltage driver $CD_X$ such that the capacitor plate 21 is driven from its clamped potential V2 to a second potential V3 which is determined such that $$V3=V1-V_t$$

Where $V_t$ is the threshold voltage of the transistor comprising the transfer element. As a result of the change in potential of the capacitor plate 21, the other plate 22 undergoes a corresponding change in potential. The potential difference $V_c$ resulting from any charge stored on the capacitor $C_X$ causes the transfer element $S_X$ to turn on and discharge capacitor $C_X$ into capacitor $C_Y$ in the next circuit stage. The discharge current continues to flow through the transfer element until the capacitor plate 22 reaches the potential $V1-V_t$. When this condition has been reached, the control signal to the driver $CD_X$ is used to drive the capacitor plate 21 back to its original clamped potential V2, causing a similar change in the potential of the capacitor plate 22. The transfer element $S_X$ returns to its non-conductive condition ready for further charge accumulation on the capacitor $C_X$. The preceding transfer element $S_{X-1}$, which was held by the gate driver $GD_{X-1}$ in its non-conductive condition to determine the direction of charge transfer, has its gate potential restored to V1.

The use of the charge transfer circuit stage of FIG. 3 in the construction of an image intensifier readout array is illustrated in FIG. 4. The arrangement comprises a number of similar charge transfer chains generally indicated as CT1, CT2, ... each comprising a series connected arrangement of charge transfer stages as shown in FIG. 3. In the arrangement of FIG. 4, a single set of charge transfer control drivers CD1, CD2, ... is used to control the respective stages of all the charge transfer chains, although it will of course be appreciated that distributed drivers could be employed. Similarly, a single set of gate voltage drivers GD1, GD2, ... is employed to control the respective transfer elements S1, S2, ... of the charge transfer chains. Each capacitor C1, C2, ... of the array is charged by the corresponding photo-current applied to one terminal.

It will be appreciated that the image readout array of FIG. 4 may be constructed in CMOS or BiCMOS technology.

In the image readout array of FIG. 4, charge is transferred along each TDI chain in a travelling wave process in which charge is transferred from the m-$1^{th}$ stage to the m$^{th}$ stage and then from the m-$2^{th}$ stage to the m-$1^{th}$ stage and so on backwards along the chain. At each stage, the total charge is integrated from the photo-detector associated with a particular image point so that the final output from the chain represents the time integrated charge from all the photo-detectors associated with that image point. Operation of the charge transfer drivers and gate drivers in the desired timing sequence is determined via a timing and control circuit 31.

Figure 5:
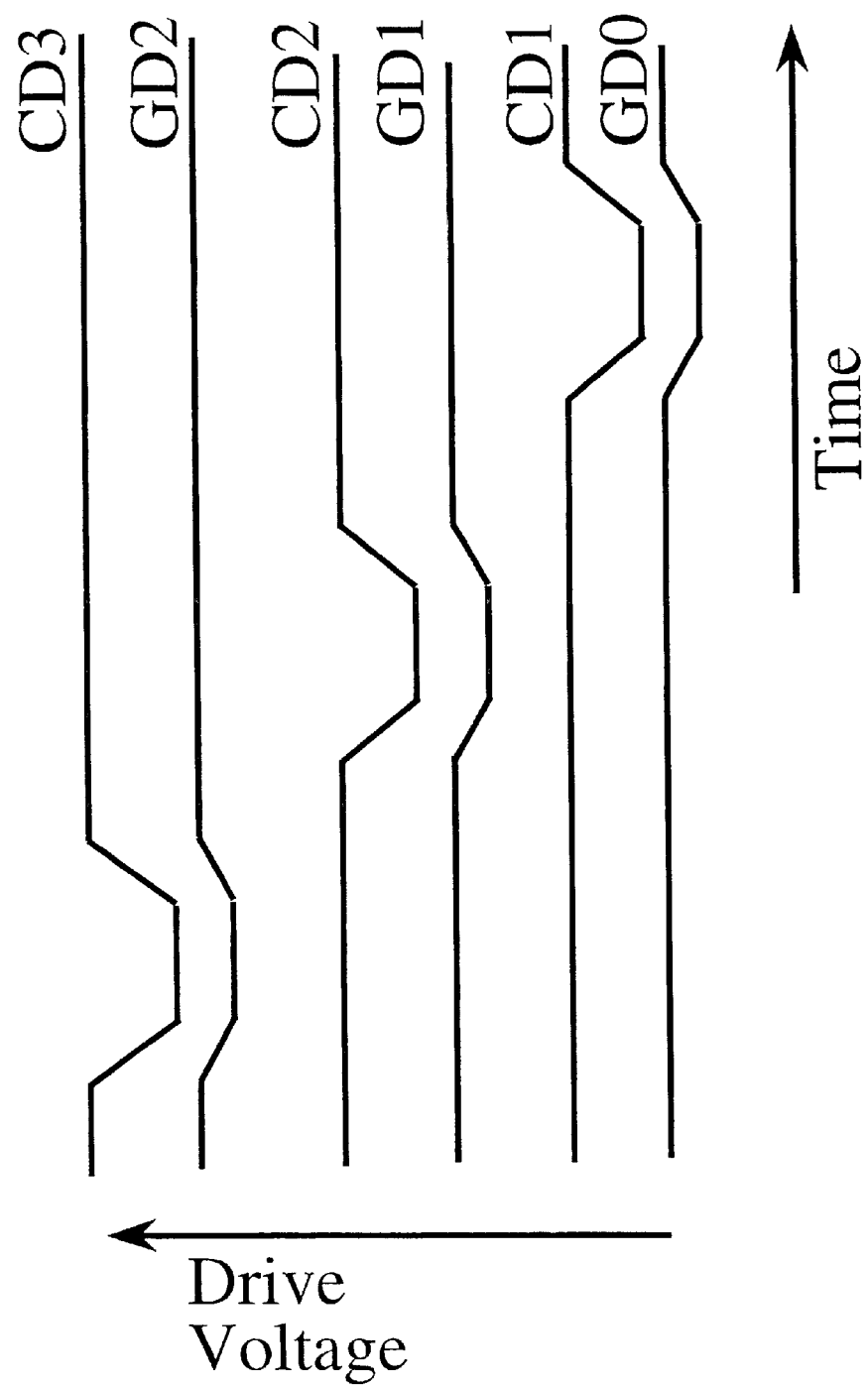
FIG. 5 illustrates typical control voltage waveform employed in the operation of the TDI chain of FIG. 4.

FIG. 5 illustrates in schematic form a typical set of charge transfer control and gate control waveforms that achieve the above described transfer of integrated charge along the TDI chains of FIG. 4. As can be seen from FIG. 5, the gate drive voltages to the transfer elements are controlled in both timing and magnitude to control the forward direction of charge transfer along each chain. Whenever a particular transfer element is in its conductive condition, a control voltage is applied to its predecessor in the chain to ensure that the predecessor remains in its non-conductive condition so as to prevent leakage of charge back along the chain.

Figure 6:
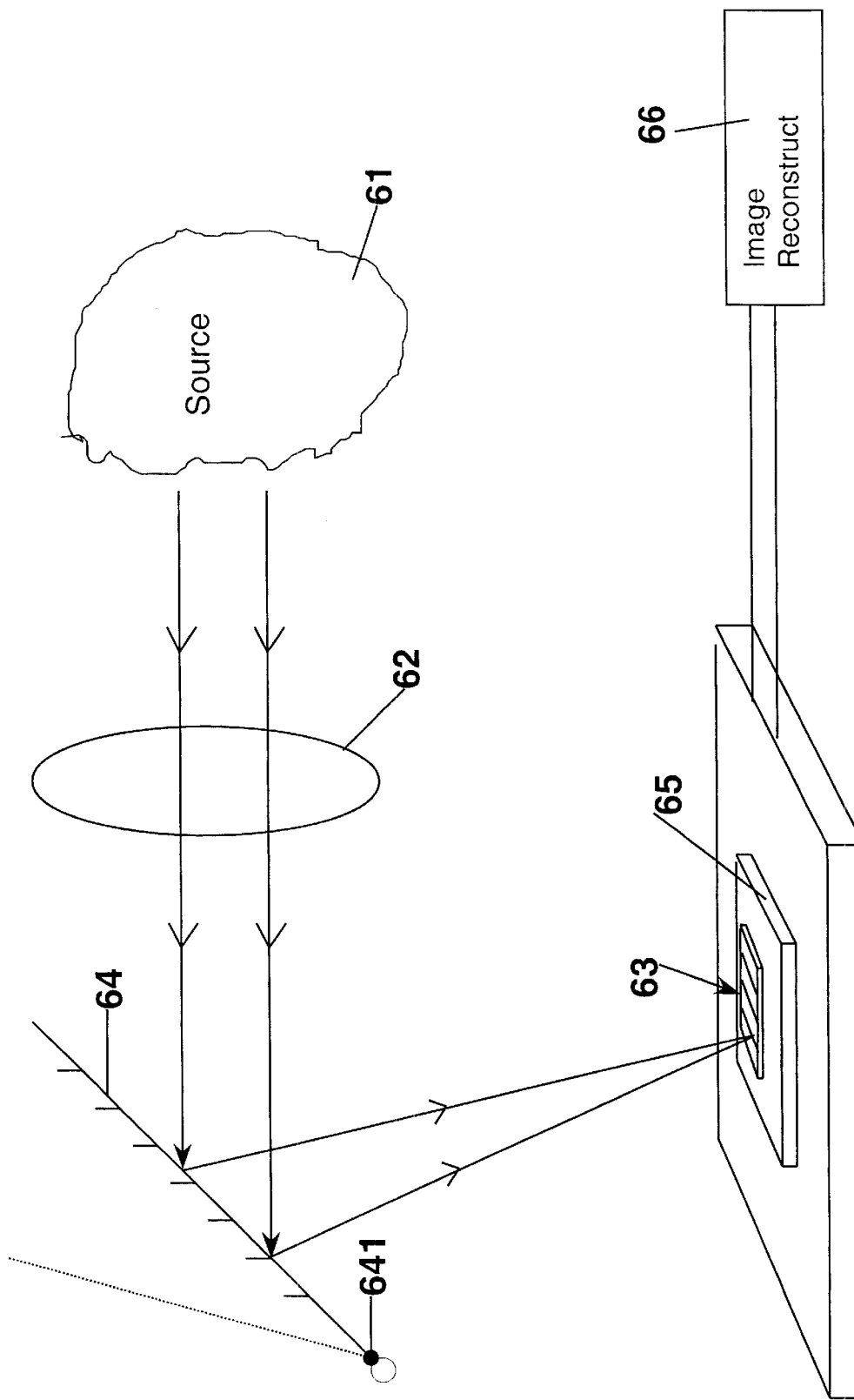
FIG. 6 illustrates the general construction of an imaging system incorporating the TDI chain technique of FIG. 4.

Referring now to FIG. 6, this shows in schematic form an optical or infra-red imaging system incorporating a time delay integration arrangement and illustrates an exemplary application of the circuit arrangements of FIGS. 3 and 4. Optical or infra-red light from a source 61 is focussed by a convex lens 62 on to the surface of detector array 63 via a movable plane mirror 64. In use, the mirror 64 is rotated or oscillated back and forth about an axis 641 so as to scan the image signal across the surface of the detector array on a cyclic basis.

The detector array, generally indicated as 63, is mounted on a readout ASIC 65, and this assembly is preferably cooled to a low temperature e.g. with liquid nitrogen. The output from the readout ASIC is coupled to a processor 66 which reconstructs the image.

The detector array 63, as discussed above with reference to FIG. 2, incorporates a rectangular array of rows and columns of photo-diodes, the photo-diodes of each row being coupled to the corresponding inputs of a respective multistage time delay integration (TDI) circuit embodied in the ASIC. In use, each scan of the image across an individual photo-diode of the array generates a corresponding photo-current signal or charge. The photo-current signals for each photo-diode are integrated over a time period by the TDI circuit to build up an enhanced image which can be displayed to a user via the processor or image reconstruction device 56.

It will be understood that the above description of a preferred embodiment is given by way of example only and that various modifications may be made by those skilled in the art without departing from the spirit and scope of the invention.

What is claimed is:

1. A charge transfer circuit for an imaging array, the circuit comprising a plurality of concatenated charge transfer stages each incorporating; a charge storage element for storing accumulated charge generated by a photo-detector responsive to electromagnetic radiation incident thereon, a transfer element to which the charge storage element is coupled, a first voltage driver coupled to the storage element, a second voltage driver coupled to the transfer element, and control means for said first and second voltage drivers, wherein the control means is arranged to apply selectively respective potential conditions to the storage element and to the transfer element of one of said plurality of concatenated charge transfer stages of the array so as to transfer the accumulated charge stored in the storage element to the storage element of the next stage of the array.

2. A charge transfer circuit as claimed in claim 1, wherein said transfer element comprises a field effect transistor.

3. A charge transfer circuit as claimed in claim 2, wherein said storage element comprises a capacitor.

4. An imaging array comprising a plurality of time delay integration (TDI) charge transfer chains each said chain being constituted by a plurality of concatenated charge transfer stages each incorporating; a charge storage element for storing accumulated charge generated by a photo-detector responsive to electromagnetic radiation incident thereon, and a voltage controllable transfer element to which the charge storage element is coupled, the transfer element having a first non-conductive condition and a second conductive condition, wherein the imaging array incorporates a first set of voltage drivers each coupled to a respective storage element one in each said TDI chain, a second set of voltage drivers each coupled to a respective transfer element one in each said TDI chain, and control means for said first and second voltage drivers, wherein the control means is arranged to apply selectively to each stage of each TDI chain in sequential order respective potential conditions to the storage element of one of said plurality of concatenated charge transfer stages and to the transfer element of the immediately preceding stage of the array so as to drive the transfer element of said one stage into its conductive condition and to maintain the transfer element of the preceding sage in its non-conductive condition thereby to effect transfer of the accumulated charge stored in the storage element of said one stage to the storage element of the succeeding stage of the TDI chain.

5. An imaging array as claimed in claim 1, wherein said transfer elements each comprise a respective field effect transistor.

6. An imaging array as claimed in claim 5, wherein said storage elements each comprise a capacitor.

7. An image intensifier incorporating an imaging array as claimed in claim 4.

8. A method of operating an imaging array comprising a plurality of time delay integration (TDI) charge transfer chains each said chain being constituted by a plurality of concatenated charge transfer stages each incorporating; a charge storage element for storing accumulated charge generated by a photo-detector responsive to electromagnetic radiation incident thereon, and a voltage controllable transfer element having a first non-conductive condition and a second conductive condition and to which the charge storage element is coupled, there being a first set of voltage drivers each coupled to a respective storage element one in each said TDI chain, and a second set of voltage drivers each coupled to a respective transfer element one in each said TDI chain, the method comprising the steps of;

applying selectively, via said first voltage drivers to each stage of each TDI chain in sequential order, respective potential conditions to the storage element of one of said plurality of concatenated charge transfer stages and to the transfer element of the immediately preceding stage of the array so as to drive the transfer element of said one stage into its conductive condition and to maintain the transfer element of the preceding stage in its non-conductive condition thereby to effect transfer of the accumulated charge stored in the storage element of said one stage to the storage element of the succeeding stage of the TDI chain.

9. A method of operating an imaging array comprising a plurality of time delay integration (TDI) charge transfer chains each said chain being constituted by a plurality of concatenated charge transfer stages each incorporating; a charge storage element for storing accumulated charge generated by a respective photo-detector responsive to electromagnetic radiation incident thereon, and a voltage controllable transfer element to which the charge storage element is coupled, the transfer element having a first non-conductive condition and a second conductive condition, the method comprising the steps of;

applying selectively to each stage of each TDI chain in sequential order respective potential conditions to the storage element of one of said plurality of concatenated charge transfer stages and to the transfer element of the immediately preceding stage of the array so as to drive the transfer element of said one stage into its conductive condition and to maintain the transfer element of the preceding sage in its non-conductive condition thereby to effect transfer of the accumulated charge stored in the storage element of said one stage to the storage element of the succeeding stage of the TDI chain.

10. A charge transfer circuit for an imaging array, the circuit comprising a plurality of concatenated charge transfer stages each incorporating; a capacitive charge storage element in which, in use, charge is accumulated, and a transfer element comprising a field effect transistor coupled between said charge storage element and the charge storage element of the next concatenated stage, said transfer element having a first non-conductive condition and a second conductive condition determined by a potential condition applied thereto so as to provide selective transfer of the accumulated charge stored in said storage element to the storage element of said next concatenated stage.

* * * * *